United States Patent [19]

Jones et al.

[11] Patent Number: 4,568,247
[45] Date of Patent: Feb. 4, 1986

[54] BALANCED BLADE VIBRATION DAMPER

[75] Inventors: John C. Jones, Stuart; Alfred P. Matheny, Jupiter, both of Fla.

[73] Assignee: United Technologies Corporation, Hartford, Conn.

[21] Appl. No.: 594,608

[22] Filed: Mar. 29, 1984

[51] Int. Cl.⁴ .............................................. F01D 5/10
[52] U.S. Cl. .................................. 416/190; 416/145; 416/193 A; 416/500
[58] Field of Search ................... 416/144, 145, 193 A, 416/190, 500

[56] References Cited

U.S. PATENT DOCUMENTS

| | | | |
|---|---|---|---|
| 2,999,668 | 9/1961 | Howald et al. | 416/145 X |
| 3,723,023 | 3/1973 | Crick | 416/500 X |
| 3,887,298 | 6/1975 | Hess et al. | 416/500 X |
| 4,088,421 | 5/1978 | Hoeft | 416/145 X |
| 4,101,245 | 7/1978 | Hess et al. | 416/500 X |
| 4,182,598 | 1/1980 | Nelson | 416/193 A |
| 4,343,594 | 8/1982 | Perry | 416/500 X |
| 4,347,040 | 8/1982 | Jones et al. | 416/500 X |
| 4,355,957 | 10/1982 | Sifford et al. | 416/500 X |
| 4,473,337 | 9/1984 | Leonardi et al. | 416/500 X |

FOREIGN PATENT DOCUMENTS 995514  6/1965  United Kingdom ................ 416/145

Primary Examiner—Everette A. Powell, Jr.
Attorney, Agent, or Firm—Stephen E. Revis

[57] ABSTRACT

A blade vibration damper for a rotor assembly of an axial flow machine seats simultaneously on a radially inwardly facing surface of a blade platform and the radially inwardly facing surface of an adjacent element, such as the platform of a circumferentially adjacent blade. The damper has its mass center of gravity nearer one contact area than the other so as to reduce the normal load on the blade platform generated by centrifugal force. By properly locating the center of gravity of the damper, the size of the normal force can be optimized to maximize damping.

11 Claims, 8 Drawing Figures

BALANCED BLADE VIBRATION DAMPER

The Government has rights in this invention pursuant to contract number N00019-81-C-0100 awarded by the Department of the Navy.

DESCRIPTION

1. Technical Field

This invention relates to axial flow turbomachinery, and more specifically to damping blade vibrations therein.

2. Background Art

In a typical rotor assembly of an axial flow turbine, such as the turbine section of a gas turbine engine, a plurality of rotor blades extend outwardly from a disk or drum shaped structure. Each of the blades includes an airfoil extending across an annular flowpath, a root integral with the base of the airfoil and interlockingly engaging the disk or drum, and a platform joined to the base of the airfoil defining the inner boundary of the working medium flowpath. The blades, in turbine embodiments, extract energy from the working medium gases flowing thereacross.

The sequence of rotor blades passing through local aerodynamic perturbations in the working medium flowpath initiate alternatingly increased and decreased loadings on the blades. This variation in loading characteristic induces blade deflection and imparts a stress on the blade material. If the frequency at which the loading characteristic varies is coincident with the natural frequency of the blade, resonance occurs. The deflection amplitude thereupon becomes reinforcing and vibratory damage is likely to result.

Vibratory phenomenon and the need to attend to such problems in rotary machines has long been recognized. U.S. Pat. No. 3,112,915 to Morris entitled "Rotor Assembly Air Baffle"; U.S. Pat. No. 3,266,770 to Harlow entitled "Turbomachine Rotor Assembly"; U.S. Pat. No. 3,610,778 to Schottikon entitled "Support for Rotor Blades In a Rotor"; U.S. Pat. No. 3,666,376 to Damlis entitled "Turbine Blade Damper"; U.S. Pat. No. 3,709,631 to Karstensen et al entitled "Turbine Blade Seal Arrangement"; U.S. Pat. No. 3,751,183 to Nichols et al entitled "Interblade Baffle and Damper"; U.S. Pat. No. 3,887,298 to Hess et al entitled "Apparatus for Sealing Turbine Blade Damper Cavities"; U.S. Pat. No. 4,182,598 to Nelson entitled "Turbine Blade Damper"; and British Pat. No. 1,259,750 entitled "Rotor For a Fluid Flow Machine" are representative of the substantial attempts to solve rotor blade vibration problems in the past. A more recent patent dealing with this subject is commonly owned U.S. Pat. No. 4,347,040 to Jones et al entitled "Blade to Blade Vibration Damper".

Each of the structures described in the above patents is of the blade to blade type configuration in which the damper, under centrifugal loads, is urged outwardly against the underside or radially inwardly facing surface of the platforms of two adjacent blades, bridging the gap between them. As specifically discussed in the last mentioned Jones et al patent, the vibratory energy of the blades is dissipated as heat created by friction between the dampers and the blade platforms. This requires relative movement between the dampers and the blade platforms during operation of the machine. Centrifugal forces during operation create normal loads between the platform and damper contacting surfaces. In the prior art these dampers are substantially symmetrical in a circumferential plane about a radial line, such that their center of gravity lies midway between the areas of contact on adjacent blade platforms. The normal forces are thus divided equally between the areas of contact on each platform.

The "slipload force" is the force required to cause movement between the damper and the platform and is a direct function of the normal load between each damper and platform contact area. The normal load is a function of damper weight and rotor speed. If the blade vibratory energy is insufficient to overcome the slipload force, no relative movement occurs and no damping takes place. With prior art symmetrical dampers, since half the damper weight always contributes to the magnitude of the slipload force, the only way to reduce the slipload force is to reduce damper weight. There are, of course, limits to weight reduction since the dampers must also be sufficiently stiff such that relative movement between adjacent blades (due to vibrations and tolerances) is not totally compensated for by bending of the damper. As the weight and size of a damper is reduced, it becomes more difficult to make it sufficiently stiff, to maintain its structural integrity, and to manufacture it to required tolerances. U.S. Pat. No. 4,347,040 is a symmetrical damper which is both very lightweight and structurally stiff.

For certain applications it may be desirable or necessary to reduce the slipload forces even further than would be possible using prior art dampers. The present invention, as hereinafter described, permits just that.

DISCLOSURE OF INVENTION

One object of the present invention is a blade vibration damper which creates a very small slipload force during operation.

Another object of the present invention is a blade vibration damper which, in operation, creates a slipload force smaller than the slipload force of prior art dampers having the same weight and stiffness.

Another object of the present invention is a blade vibration damper which can readily be constructed with good stiffness and creates a low slipload force.

Yet another object of the present invention is a blade vibration damper which can readily be configured to create a preselected low slipload force without undue concern for overall damper weight.

According to the present invention, a blade vibration damper extending between and contacting a rotor blade platform and the surface of an adjacent element has its mass center of gravity off center thereby dividing the normal loads unequally between the platform and adjacent element and reducing the slipload force on one of them to less than what it would have been if the damper were symmetrical. The adjacent element is preferably the platform of a circumferentially adjacent rotor blade, but it could also be the surface of another element of the rotor assembly, such as a coverplate, which rotates along with the blade.

The damper of this invention is constructed such that the center of gravity is located between the two areas of contact, but is closer to one area of contact than the other such that the normal load during operation is not split evenly between the two areas of contact. By shifting the center of gravity toward one of the contact areas, the slipload force is increased at that area of contact while the slipload force at the other area of contact is correspondingly decreased. Theoretically, the slipload force at one area of contact can be made as light as desired; however, some load is required in order that rubbing of the platform occurs during normal engine operating conditions to assure that the vibratory energy is dissipated. The slipload force at the heavily loaded contact area may be made so large that the vibratory energy cannot overcome it, and all the energy will be dissipated at the adjacent contact area. In that case, one side of the damper is said to be "locked-up". It is not required that one side be locked-up. The only requirement is that the damper never be locked-up on both contact areas at the same time.

With the present invention, lowering the slipload forces does not necessarily require reducing the damper weight. This permits the use of larger dampers which can be more easily made with the required stiffness.

The foregoing and other features and advantages of the present invention will become more apparent in the light of the following description and accompanying drawing.

BEST MODE FOR CARRYING OUT THE INVENTION

Figure 1:
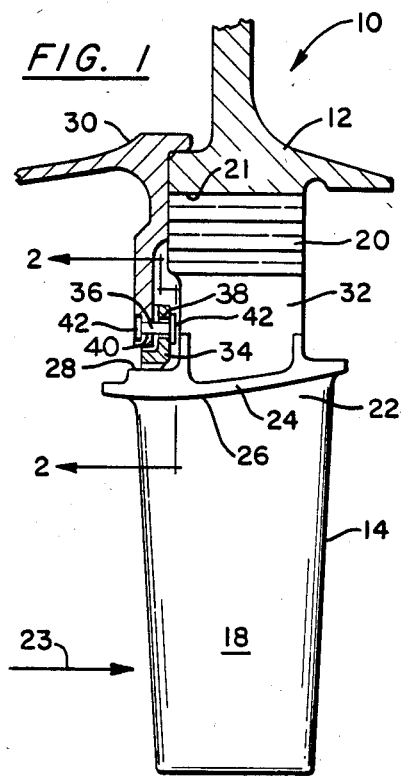
FIG. 1 is a simplified cross-sectional view taken through a portion of the turbine section of a gas turbine engine.
Figure 3:
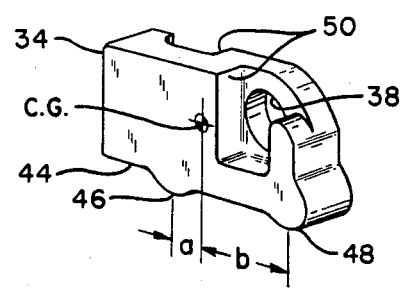
FIG. 3 is a perspective view of a blade vibration damper constructed in accordance with the teachings of the present invention.

The rotor assembly 10 of FIG. 1 is of the type utilized in the turbine section of a gas turbine engine. The assembly 10 comprises a rotor disk 12 having a plurality of rotor blades secured thereto, as represented by the single blade 14. Each blade 14 comprises an airfoil 18 having a base 22 and a root section 20 integral therewith. The root section 20 engages slots 21 in the rotor disk 12, and the airfoil 18 spans a flow path 23. Each blade 14 also includes a platform 24 adjacent the base of the airfoil. The platform 24 has a radially outwardly facing surface 26 which forms the inner boundary of the flowpath 23, and a radially inwardly facing, circumferentially extending surface 28. A coverplate 30 is illustrated at the upstream end of the rotor disk 12. The coverplate holds the root sections 20 of the rotor blade in engagement with the rotor disk 12. Attached to the coverplate 30 and disposed between the coverplate 30 and the extended root portions 32 of the blades 14 are a plurality of rotor blade dampers 34, one for each blade. Each damper 34 is attached to the coverplate 30 by a rivet 36 which passes through an axially extending hole 38 in the damper 34 (see, FIG. 3) and through one of a plurality of circumferentially spaced apart holes 40 in the coverplate 30. The rivets 36 have enlarged heads 42 at each end to restrict axial movement of the dampers; but the rivets are not tight enough to restrict radial and circumferential movement. The shafts of the rivets 36 are considerably smaller in diameter than the holes 38 through the dampers such that, during engine operation, each damper 34 is assured of being able to seat against the radially inwardly facing surface 28 of each of two adjacent blade platforms 24.

Figure 2:
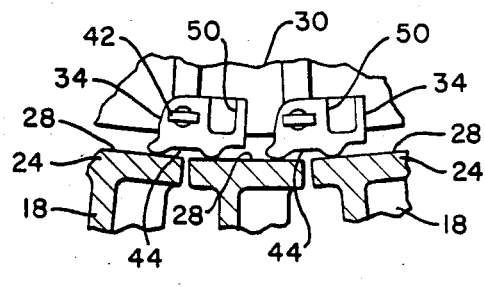
FIG. 2 is a simplified cross-sectional view taken along the line 2—2 of FIG. 1.

As best illustrated in FIG. 2, the body of each damper has a radially outwardly facing surface 44 which includes first and second circumferentially spaced apart protrusions 46, 48, respectively. In this particular embodiment the protrusions 46, 48 are convexly curved portions of cylindrical surfaces, with the axes of the cylinders being parallel to the axis of the rotor assembly 10. The first protrusion 46 contacts a narrow, axially extending band of surface area on the surface 28 of one blade platform; and the second protrusion 48 contacts a narrow substantially axially extending band of surface area on the surface 28 of the next adjacent blade platform 24.

The damper 34 is of the generic "blade to blade" type which bridges the gap between adjacent blade platforms. Vibratory energy is removed from the system in the form of heat generated by the rubbing of the contacting damper and platform surfaces as they move relative to one another. As mentioned above, sufficiently high damper stiffness is required to be sure relative motion between adjacent platforms is not compensated for by bending of the damper with the result that no relative motion occurs between the damper and the blade platforms at either of the contact areas.

Although the present invention permits the use of heavier dampers to achieve the desired stiffness, lighter weight is always helpful for reducing slipload forces; and, in aircraft engines, weight reduction is important in and of itself. In the perspective view of the damper 34 shown in FIG. 3, the damper is made as light as possible for its overall size by the use of cutouts 50. The cutouts 50 are located and sized to maximize stiffness by creating a webbed and ribbed type damper body.

Figure 4:
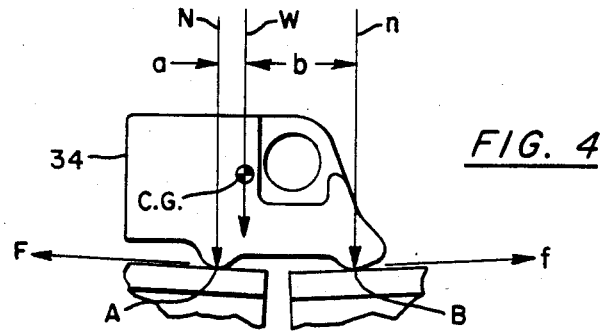
FIG. 4 is an illustration of damper force loading.

In accordance with the present invention, and best illustrated in FIG. 4, the damper 34 is constructed such that its center of gravity is positioned closer to the first protrusion 46 than to the second protrusion 48. In other words, the center of gravity is closer to the first area of contact A than to the second area of contact B. In FIG. 4 the vector $\overline{N}$ represents the direction, location and magnitude of the sum of the normal forces over the contact area A, and the vector $\overline{n}$ represents the position, direction and magnitude of the sum of the normal forces over the contact area B during operation of the rotor assembly. $\overline{W}$ is a vector which represents the net centrifugal force created by the damper 34 which passes through the damper center of gravity (C.G.). Assuming, for purposes of this discussion, that $\overline{N}$, $\overline{W}$, and $\overline{n}$ are parallel, let the perpendicular distance between $\overline{W}$ and $\overline{N}$ be represented by "a" and the perpendicular distance between $\overline{W}$ and $\overline{n}$ be represented by "b". The following equations will then apply:

$$W = N + n \tag{1}$$

$$aN = bn \text{ or } \frac{N}{n} = \frac{b}{a} \tag{2}$$

In the prior art, with symmetrical dampers, N was always substantially equal to n. In other words, neither N nor n varied from 0.5W by more than about 5%, variations being due to manufacturing tolerance or other required mechanical design features. Since the slipload force at an area of contact is equal to the normal load times a constant K, the slipload force for a prior art symmetrical damper could never be less than approximately 0.5WK. With the present invention, the slipload force may be significantly less than 0.5WK. From equations (1) and (2):

$$n = \frac{aW}{a+b} \quad (3)$$

Thus, if the distance between the vector $\overline{N}$ and the vector $\overline{n}$ is 0.5 inch, and if a=0.1 inch, then n would equal only 0.2W which is 40% of the minimum nominal normal force possible using a damper of the prior art having the same weight as the damper of the present invention. The slipload force f at the interface B would then equal 0.2WK and the slipload force F at the interface A would be 0.8WK. In order to clearly distinguish over the symmetrical dampers of the prior art, the distance "a" of a damper of the present invention must be substantially less than the distance "b". In the context of the present invention this means that a/(a+b) should be no more than about 0.4.

Figure 5:
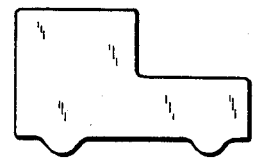
FIG. 5 is a simplified view of an alternate configuration for a blade vibration damper constructed in accordance with the teachings of the present invention.

For purposes of comparison, the symmetrical damper shown and described in hereinabove referred to U.S. Pat. No. 4,347,040 generates (in one mode of operation of a typical high performance aircraft engine) a normal force at each of the two contact areas on adjacent platforms of about 85 lbs. A damper according to the present invention which is the same weight and stiffness may, for example, be readily constructed in the configuration of FIG. 5, such that the normal force created at one of the interfaces A or B under the same conditions of engine operation is only about 15 lbs. The slipload force would be correspondingly reduced.

Figure 6:
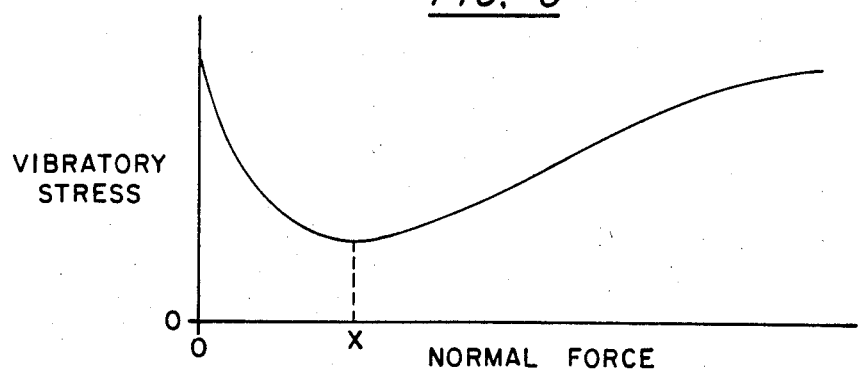
FIG. 6 is a graph showing the reduced vibratory stresses which can result from use of the present invention.

It is apparent from the foregoing that the normal load n can theoretically be made nonexistent by having the damper C.G. on or to the left of the vector $\overline{N}$ in FIG. 4. Obviously the C.G. must be located between the interfaces A and B if any damping is to take place. The graph of FIG. 6 is typical for gas turbine engine rotors, and shows there is an optimum normal force (i.e. an optimum position for the center of gravity) in terms of minimizing vibratory stresses. The vertical scale represents vibratory stress, which the damper is attempting to reduce. The normal force on a blade platform is plotted on the horizontal axis. It is assumed that the stiffness of the damper is the same for all values of the normal force. The optimum normal force is designated X. Prior art dampers cannot always be made light enough to optimize damping, even assuming, arguendo, that the optimum weight is a known quantity. A damper can almost always be designed in accordance with the teachings of the present invention to yield the optimum normal force within practical damper weight limitations and having adequate stiffness. This is a significant advance over the prior art.

Figure 7:
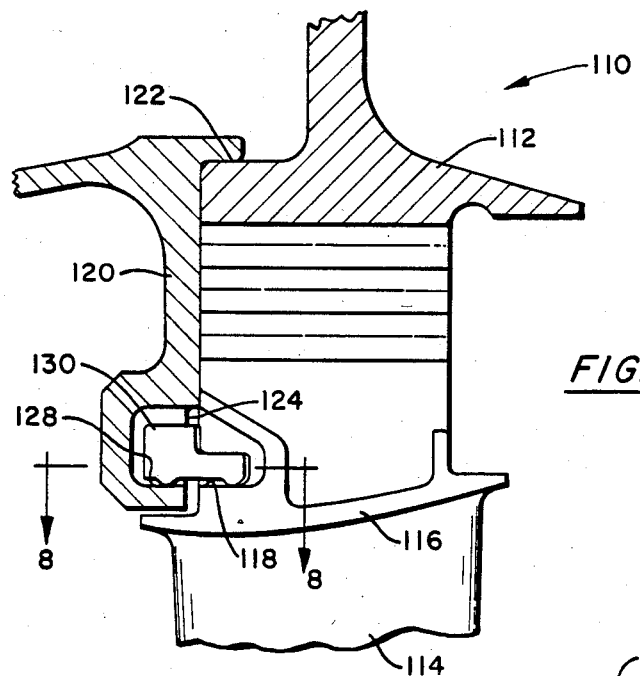
FIG. 7 is a simplified sectional view of a rotor assembly in accordance with an alternate embodiment of the present invention.
Figure 8:
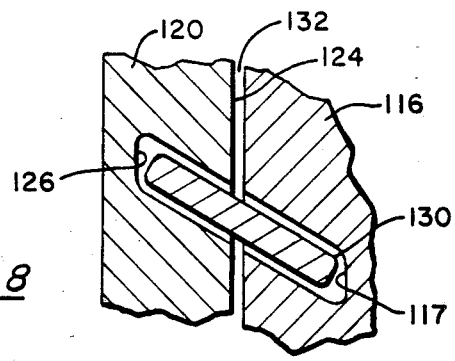
FIG. 8 is a sectional view taken along the line 8—8 of FIG. 7.

Referring to FIGS. 7 and 8, the present invention is shown as a "blade to ground", rather than blade to blade damper. The rotor assembly is designated by the reference numeral 110 and comprises a rotor disk 112 having a plurality of rotor blades secured thereto as represented by the single blade 114. Each blade 114 includes a platform 116 having a cutout 117 therein defining a radially inwardly facing surface 118. A coverplate 120 is attached to the disk 112 at a snap diameter 122 and rotates therewith during engine operation.

The coverplate 120 has an annular surface 124 facing the disk 112. The surface 124 has cutouts 126 spaced circumferentially about the rotor centerline in opposed relation to the platform cutouts 117. Each cutout 126 defines a radially inwardly facing surface 128 adjacent each platform surface 118. A nonsymmetrical blade vibration damper 130 bridges the gap 132 between each pair of adjacent surfaces 128 and 118 and is trapped in position within the cavity formed by the opposing cutouts 126 and 117. During operation each damper 130 seats against a blade platform and the coverplate. The damper 130 is designed such that its C.G. is closer to its area of contact with the surface 128 of the coverplate 120 than to its area of contact with the blade platform surface 118. The normal force on the blade platform can thereby be made as light as desired to optimize damping.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In a rotor assembly of the axial flow rotary machine type having an individually mounted first rotor blade extending radially outwardly from a disk, said blade including a platform having a surface facing radially inwardly, the assembly including an element separate from said rotor blade and adapted to rotate therewith, said element having a radially inwardly facing surface adjacent said surface of said blade platform, the improvement comprising:

a blade damper disposed on one side of the rotor disk and having an outwardly facing surface adapted to simultaneously seat against said inwardly facing surface of said blade platform over a first area of said platform surface and against said inwardly facing adjacent surface of said element over a second area of said element surface in response to centrifugally generated loads in an operating machine, said damper having a center of gravity spaced a distance "a" from a first vector representing the sum of the normal force vectors created by said damper on said first area, and spaced a distance "b" from a second vector representing the sum of the normal force vectors created by said damper on said second area, wherein the distance "a" is substantially less than "b" and said center of gravity is located between said first and second vectors, whereby the slipload force between the damper and the first area will be substantially less than the slipload force between the damper and the second area during operation.

2. The invention according to claim 1 wherein said element is a coverplate.

3. The invention according to claim 1 wherein said element is a second individually mounted rotor blade extending outwardly on the machine and including a platform, said inwardly facing surface of said element being a surface of said second rotor blade platform.

4. The invention according to claim 2 including a disk having a blade slot therein, said first rotor blade having a root portion disposed within and engaging said slot, said coverplate being secured to said disk and adapted to hold said root portion in engagement with said slot.

5. In a rotor assembly of the axial flow rotary machine type in which a plurality of individually mounted blades extend radially outwardly from a disk, each blade including a platform having a radially inwardly facing surface, the improvement comprising:

a blade to blade damper disposed on one side of the rotor disk and having an outwardly facing surface adapted to simultaneously seat against said inwardly facing surface of one of said blade platforms over a first area and against said inwardly facing surface of an adjacent blade platform over a second area in response to centrifugally generated loads in an operating machine, said damper having a center of gravity spaced a distance "a" from a first vector representing the sum of the normal force vectors created by said damper on said first area, and spaced a distance "b" from a second vector representing the sum of the normal force vectors created by said damper on said second area, wherein the distance "a" is substantially less than "b" and said center of gravity is located between said first and second vectors, whereby the slipload force between the damper and the first area will be substantially less than the slipload force between the damper and the second area during operation.

6. The invention according to claim 5 wherein said center of gravity is located sufficiently close to said first vector that the slipload force at said second areas is always less than the forces generated by said blades during normal machine operation which act to overcome said slipload force, and the slipload force at said first area is always greater than the forces generated by said blades during normal machine operation which act to overcome said slipload force at said first area, whereby vibrating blade energy is dissipated in the form of heat energy at said second contact area but not at said first contact area.

7. The invention according to claim 5 wherein the ratio $a/(a+b)$ is no more than about 0.40.

8. The invention according to claim 5, wherein said damper includes a first convexly curved protrusion, said protrusion contacting said second area.

9. The invention according to claim 8 wherein said damper includes a second convexly curved protrusion circumferentially spaced from said first protrusion and contacting said second area.

10. The invention according to claim 5 including coverplate means, said damper being disposed between said blades and coverplate means.

11. The invention according to claim 10 wherein said damper includes an axially extending hole therethrough, and wherein said coverplate means includes an axially extending hole therethrough aligned with said hole through said damper, and means extending through said aligned holes in said damper and coverplate for loosely attaching said dampers to said coverplate means.

* * * * *